United States Patent [19]

Kobe et al.

[11] 3,865,824

[45] Feb. 11, 1975

[54] 2-ARYL-7-SUBSTITUTED PYRAZOLO [1,5a] 1,3,5-TRIAZINES

[75] Inventors: Joze Kobe, Costa Mesa; Darrell E. O'Brien, Mission Viejo; Roland K. Robins, Santa Ana, all of Calif.

[73] Assignee: ICN Pharmaceuticals, Inc., Pasadena, Calif.

[22] Filed: Mar. 7, 1972

[21] Appl. No.: 232,632

[52] U.S. Cl.......... 260/248 NS, 260/249.5, 424/249
[51] Int. Cl............................................ C07d 57/34
[58] Field of Search.................... 260/248 NS, 249.5

[56] References Cited
UNITED STATES PATENTS 3,549,631  12/1970  Lewis et al...................... 260/249.5

Primary Examiner—John Ford
Attorney, Agent, or Firm—Lyon & Lyon

[57] ABSTRACT 2-aryl-7-substituted pyrazolo[1,5a]1,3,5-triazine derivatives are disclosed which are useful as 3′,5′-cyclic AMP phosphodiesterase inhibitors. These compounds are prepared by condensation of aryl-β-ketonitrile derivatives with thiosemicarbazide which affords the corresponding 3-amino-2-thiocarbamoyl-5-aryl pyrazoles which, when heated with diethoxymethylacetate, give 2-aryl-7-mercapto pyrazolo [1,5a]1,3,5-triazines. The mercapto derivatives may then be methylated with methyl iodide to afford 2-aryl-7-methylthio-pyrazolo[1,5a]1,3,5,-triazines. Nucleophilic displacement of the methylthio moiety with various amines and sodium alkoxides yields the appropriately substituted 2-aryl-7-substituted pyrazolo[1,5a]1,3,5-triazines.

11 Claims, No Drawings

2-ARYL-7-SUBSTITUTED PYRAZOLO (1,5,4) 1,3,5-TRIAZINES

BACKGROUND OF THE INVENTION

As reported by Sutherland et al in "Cyclic AMP," *Am. Rev. Biochem.* 37, 149 (1968), cyclic adenosine monophosphate (C-AMP) has been established as an intracellular "second messenger," mediating many of the actions of a variety of different hormones. According to this theory, first messenger hormones, epinephrine and norepinephrine, influence adenyl cyclase contained at or within cell walls to form intracellularly cyclic AMP from adenosine triphosphate upon receipt of the extra-cellular hormone signal. The formed cyclic AMP in turn functions as a second messenger and stimulates intracellular functions particular to the target cells of the hormone. Cyclic AMP has thus been shown to "activate" protein kinases, which in turn produce physiological effects such as muscle contraction, glycogenolysis, steriodogenisis and lipolysis.

Cyclic AMP is degraded, however, in vivo by phosphodiesterase enzymes, which catalyze hydrolysis of the cyclic purine nucleotide to 5'-adenosine monophosphate with a consequent loss of function. It has accordingly been suggested that substituted cyclic AMP analogs which are more resistant to phosphodiesterase degradation than the naturally occurring cyclic nucleotide might be administered in aid of lagging cellular processes. Synthetic production of such compounds, however, is quite costly. It would be advantageous, therefore, to enhance the beneficial effects of naturally produced cyclic AMP by administering compounds which are capable of inhibiting the undesirable effects of phosphodiesterase enzymes.

Sutherland, et al., in *Circulation* 37, 279 (1968), suggest that the pharmacological effects of theophylline, which has the structure

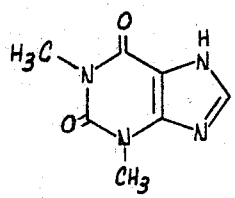

are the result of its ability to inhibit the action of phosphodiesterase enzymes. Theophylline has thus been employed in lieu of the adenyl cyclase-stimulating hormones, epinephrine and norepinephrine, as a heart stimulant following cardiac arrest and in refractory asthma cases as a bronchial dilator. Theophylline, however, does not selectively inhibit phosphodiesterase, but rather gives general stimulation to the central nervous system. Accordingly, the use of theophylline can make the recipient nervous and irritable and can also create cardiovascular effects, i.e., rapid beating. By the same token, theophylline is not as potent as a phosphodiesterase inhibitor as is desired and consequently has to be used in larger quantities, which, or course, can further the undesirable effects enumerated above.

F. L. Rose et al in articles appearing in *J. Chem. Soc.*, 5642 (1963); 3357 (1965) and 1593 (1969) have reported a number of triazolo[2,3c]pyrimidines and triazolo[4,3c]pyrazines (for example, compounds 1 and 2 below), which are somewhat structurally related to theophylline and reportedly capable of protecting animals from histamine-induced bronchospasm.

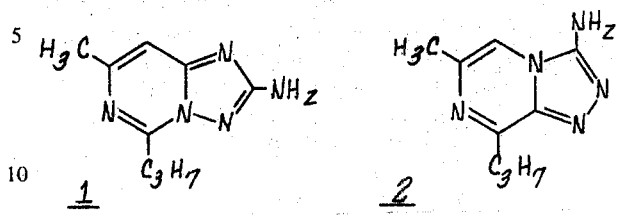

As indicated, however, in the application of Darrell E. O'Brien, et al., Ser. No. 206,538, entitled "3,5,7-trisubstituted pyrazolo[1,5a]pyrimidines," assigned to the same assignee as this application, evaluation of compound 1 to determine its phosphodiesterase inhibition capability showed that compound to be approximately equal in effect to theophylline with phosphodiesterase enzyme isolated from rabbit lung, but only about 0.2 as effective with phosphodiesterase enzyme obtained from rabbit kidney. Also, as set forth in such O'Brien, et al., application, the defined trisubstituted pyrazolo[1,5a] pyrimidines have been found to possess phosphodiesterase inhibition properties. In view of the clear need, however, for phosphodiesterase inhibiting compounds of significant potency and capable of providing the previously discussed selective inhibitions, we have discovered that 2-aryl-7-substituted pyrazolo[1,5a]1,3,5-triazines, as defined hereinafter, also possess phosphodiesterase inhibitory capability.

SUMMARY OF THE INVENTION

According to this invention, there are provided phosphodiesterase inhibitors of the following structure

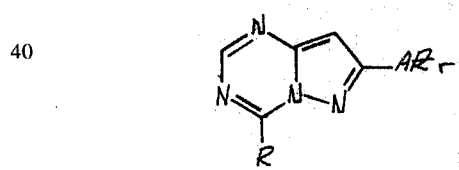

wherein R is SH; —NH$_2$; OH; NH—NH$_2$; N=N=N; SR$_1$, OR$_1$, NHR$_1$ or N(R$_1$)$_2$ where R$_1$ is a C$_1$—C$_6$ alkyl; or

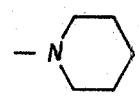

and Ar is an aryl group such as phenyl or a substituted phenyl derivative.

DETAILED DESCRIPTION OF THE INVENTION

The general procedure utilized to produce the compounds of this invention is represented by the schematic drawing which follows, the various compounds being indicated by the letters A through K inclusive. The 1-carbamoyl (compound A), 1-thiocarbamoyl (compound B), and 1-carboxamidino (compound C) derivatives of 5-amino-3-phenylpyrazole have been used as starting materials, with cyclization of each of such intermediates with diethoxymethylacetate giving the corresponding 7-hydroxy (compound D), 7-mercapto (compound E), and 7-amino (compound F) derivatives of 2-phenylpyrazolo [1,5a]1,3,5-triazine. The mercapto derivative (compound E) may be methylated with methyl iodide in a sodium hydroxide solution to afford 7-methylthio-2-phenylpyrazolo[1,5a]1,3,5-triazine (compound G). The methylthio group is very reactive toward nucleophilic reactions and by treatment with a sodium hydroxide solution or ammonium hydroxide the 7-hydroxy (compound D) and 7-amino (compound F) derivatives respectively are obtained. Analogously, when compound G is stirred at room temperature with hydrazine hydrate, the 7-hydrazino-2-phenylpyrazolo[1,5a]1,3,5-triazine (compound H) is obtained.

Treatment of the 7-hydrazino derivative (compound H) with nitrous acid affords a mixture of the azido and tetrazolo derivatives (compound I). The infra-red spectra (KBr) indicates that only the azido structure is present and the nuclear magnetic resonance spectra in trifluoroacetic acid indicates only the azidoisomer. The nuclear magnetic resonance spectra in DMSO, however, shows that tha azido and tetrazolo isomers are present in a ratio of 1:3. Compound H may also be converted to the cyclized product (compound J) with the diethoxymethylacetate at room temperature. Compound J is quite stable under normal conditions, although rearrangement to the isomeric compound K has been observed under more severe conditions. Analogously, the reaction of compound G with primary and secondary amines gives 2-phenyl-7-substituted amino pyrazolo[1,5a]1,3,5-triazine derivatives, compounds L, M, N and O.

low. In all such examples, parts and percentages are by weight and temperatures in degress Centigrade unless otherwise indicated. Melting points were taken on a Thomas-Hoover melting point apparatus and are uncorrected. Infra-red nuclear resonance spectra were determined on a Perkin-Elmer 257 grating infra-red spectrophotometer and on a Hitachi Perkin-Elmer R-20A high resolution nuclear magnetic resonance spectrophotometer respectively. All samples displayed a single spot on thin layer chromatography and were analyzed by the Heterocyclic Chemical Corporation of Harrisonville, Miss.

EXAMPLE I ps
2-phenylpyrazolo[1,5a]1,3,5-triazin-7[4H]-thione (compound E)

A mixture of compound B (2.18 g., 10 mmoles) and diethoxymethyl acetate (5.00 g.) was refluxed for 5 minutes. After cooling, the crystalline product was separated by filtration and washed with ethylacetate. The product (1.2 g.; 55 percent) was recrystallized from a mixture of ethyl acetate hexane to yield an analytically pure product that had a melting point (MP) of 213°–3°.

Anal. Calcd. for $C_{11}H_8N_4S$: C, 57.9; H, 3.53; N, 24.3. Found: C, 58.1; H, 3.79; N, 24.7.

EXAMPLE II 7-methylthio-2-phenylpyrazolo[1,5a]1,3,5-triazine (compound G)

Sodium hydroxide (100 mg) was added to a solution of compound E (550 mg., 2.5 mmoles) in 15 ml of 33 percent ethanol. Methyliodide (600 mg) was added dropwise to this solution and after a short period of stirring, the white product began to separate. After stirring

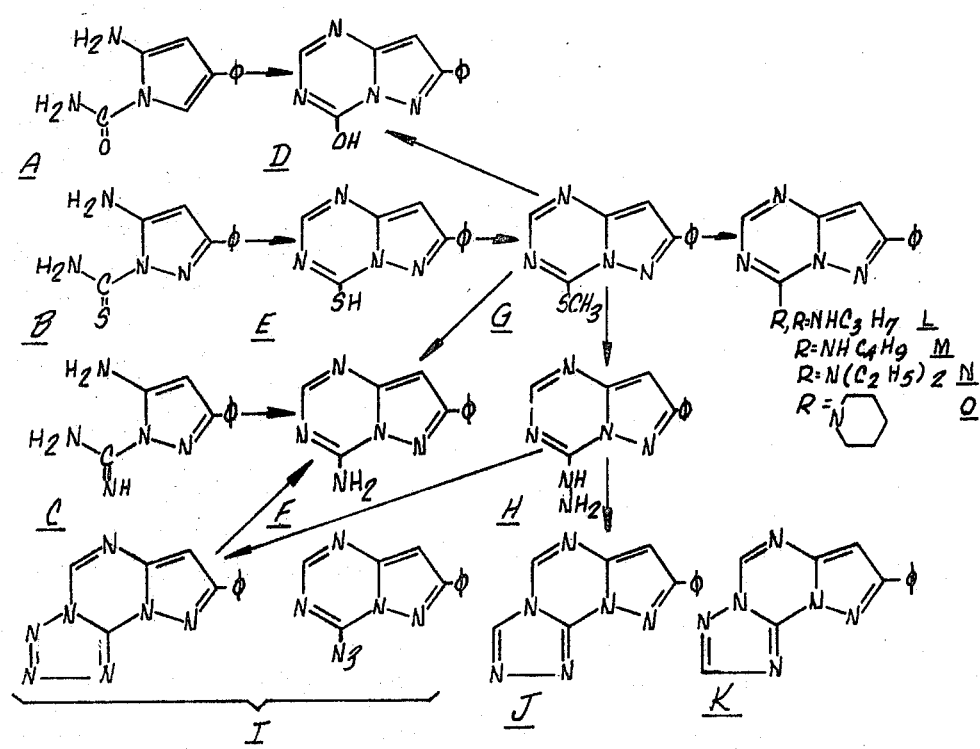

The invention will be further understood by reference to the specific but illustrative examples which follow.

for 30 minutes at room temperature the mixture was evaporated to half-volume at reduced pressure. The white product was separated by filtration. The white product (500 mg, 75 percent) was recrystallized from a mixture of ethylacetate hexane to afford an analytically pure product, MP 140°-2°.

Anal. Calcd. for $C_{12}H_{10}N_4S$: C, 59.5; H, 4.16; N, 23.1. Found: C, 59.9; H, 4.47; N, 23.4.

EXAMPLE III 2-phenylpyrazolo[1,5a]1,3,5-triazin-7[4H]-one (compound D)
Method A A mixture of compound G in 20 ml of 1N NaOH solution and 5 ml of ethanol was stirred at room temperature for 24 hours. At the end of this time the solution was acidified with 2N $H_2SO_4$ and the precipitated product was separated by filtration. The product weighed 400 mg (66 percent) and was purified by recrystallization from a mixture of ethanol and water to afford an analytically pure product that had a MP of 258°-60°.

Anal. Calcd. for $C_{11}H_8N_4O$: C, 62.2; H, 3.80; N, 26.4. Found: C, 62.2; H, 3.77; N, 26.4.
Method B A mixture of compound A (370 mg) and diethoxymethyl acetate (1.25g) was heated at reflux. The product which separates from the hot reaction mixture (300 mg, 78 percent) was identical in all respects to the product obtained by Method A.

EXAMPLE IV 7-amino-2-phenylpyrazolo[1,5a]1,3,5-triazine (compound F)
Method A A solution of compound C (750 mg, 3.7 mmoles) in diethoxymethyl acetate (3.5 g) was heated at reflux for 5 minutes. The solution was evaporated to dryness and the residue recrystallized from a mixture of ethanol and water to affored 750 mg (80 percent) of analytically pure product. MP 283°-6°.

Anal. Calcd. for $C_{11}H_9N_5$: N, 33.2
Found: N, 33.1.
Method B

A mixture of compound G (750 mg, 3.1 mmoles), ethanol (25 ml), and ammonium hydroxide solution (28 percent) (0.7 ml) was heated at 100° in a stainless steel pressure bomb. After 16 hrs., the mixture was evaporated to dryness and the residue was recrystallized from a mixture of ethanol and water to yeild 500 mg of analytically pure product.

EXAMPLE V 7-hydrazino-2-phenylpyrazolo[1,5a]1,3,5-triazine (compound H)

A mixture of compound G (750 mg, 3.1 mmoles) in methanol (30 ml) and hydrazine hydrate (85 percent) (0.2 ml) was stirred overnight at room temperature, and then heated at reflux for 30 minutes. After cooling the product was separated by filtration, washed with cold methanol, and recrystallized from methanol to afford 550 mg (78 percent) of analytically pure product. MP 201°-3°.

Anal. Calcd. for $C_{11}H_{10}N_6$: C, 58.4; H, 4.46; N, 37.1. Found: C, 55.4; H, 4.47; N, 37.21.

EXAMPLE VI 2-phenyl-s-triazolo[3,4g]pyrazolo[1,5a]1,3,5-triazine (compound J)

A suspension of compound H (1.0 g, 4.4 mmoles) in diethoxymethylacetate (5.0 g) was stirred at room temperature for 1 hr. The precipitated produce was separated by filtration and recrystallized from a mixture of dimethylformamide and toluene to yield 1.0 g (90 percent) of analytically pure product. MP 263°-5°.

Anal. Calcd. for $C_{12}H_8N_6$: C, 61.0; H, 3.41; N, 35.6. Found: C, 60.9; H, 3.18; N, 35.3.

EXAMPLE VII 2-phenyl-s-triazolo[3,2g]pyrazolo[1,5a]1,3,5-triazine (compound K)

Compound J (250 mg) was heated at its melting point for 5 minutes. The melt was allowed to solidify and then recrystallized from ethylacetate to afford 200 mg (80 percent) of analytically pure product that had a melting point of 213°-5°.

Anal. Calcd. for $C_{12}H_8N_6$: C, 61.0; H, 3.41; N, 35.6. Found: C, 61.0; H, 3.37; N, 35.5.

EXAMPLE VIII

The reaction of 7-hydrazino-2-phenylpyrazolo[1,5a]1,3,5-triazine (compound H) with sodium nitrite to afford compound I.

A solution of compound H (270 mg, 1.2 mmoles) in 5 ml of 2N hydrochloric acid was cooled to 10° and a solution of soidum nitrite (120 mg) in water (10 ml) was added dropwise. After the addition was complete the mixture was stirred at room temperature for 2 hrs. The product was separated by filtration, washed with water and recrystallized from methanol to afford 250 mg (85 percent) of analytically pure product. MP 188°-90°.

Anal. Calcd. for $C_{11}H_7N_7$: C, 55.7; H, 2.97; N, 41.3. Found: C, 55.4; H, 3.02; N, 41.5

The infra-red spectra (KBr) shows a strong azido band at 2,150 $cm^{-1}$ and a strong absorption at 1,182 $cm^{-1}$. This unassigned band, which is not present in the other derivatives of 2-phenylpyrazolo[1,5a]1,3,5-triazine, could possibly be the tetrazolo ring absorption as reported by Avramenko, et al., *Khimiya Geterotsiklicheskikh Soedinenii*, 4, 423 (1968). The nmr spectrum (DMSO) shows both the azido and tetrazolo isomers. The quilibrium constant $K_T = [(C azido)/(tetrazolo]$ is $K_T 37° = 0.5$ and $K_T 70° = 1.5$. The nmr spectra (trifluoroacetic acid) shows only the expected azido structure.

A solution of the product (100 mg) in xylene (5 ml) was refluxed for 98 hours and then cooled. The white solid (50 mg) that separated was identical in all respects to 7-amino-2-phenylpyrazolo[1,5a]1,3,5-triazine (compound F).

Although the compounds of this invention have been thus far described as phenyl triazine derivatives, as previously indicated, Ar may be other aryl groups such as a substituted phenyl derivative, as for example, halogenated, alkylated ($C_1$ to $C_6$), or a methoxy substituted derivative. Such compounds may be prepared following the procedure previously described, utilizing, of course, the appropriate aryl ketonitrile derivatives as starting materials.

EXAMPLE IX 2-phenyl-7-n-propylaminopyrazolo[1,5a]1,3,5-triazine (compound L)

A solution of 7-methylthio-2-phenylpyrazolo[1,5a]-1,3,5-triazine (G) (1.21 g, 5 mmoles) and n-propylamine (0.30 g, 5 mmoles) in 50 ml of anhydrous methanol was stirred at room temperature for 2 days (or refluxed for 4 hrs.). At the end of this time the solution was evaporated to dryness. The residue was recrystallized from a mixture of ethanol and water to afford 1.2 g (96 percent) of analytically pure material that had a melting point of 140°–1°.

Anal. Calcd. for $C_{14}H_{15}N_5$: C, 66.4; H, 5.97; N, 27.7. Found: C, 66.4; H, 6.08; N, 27.9.

EXAMPLE X

7diethylamino-2-phenylpyrazolo[1,5a]1,3,5-triazine (compound N)

A mixture of 7-methylthio-2-phenylpyrazolo[1,5a]-1,3,5-triazine (G) (0.8 g, 3.3 mmoles) and diethylamine (0.24 g, 3.3 mmoles) in 25 ml of absolute ethanol was heated at reflux for 36 hrs. At the end of this time, the solvent was removed at reduced pressure and the dark oil residue was covered with 10 ml of water. The white solid residue that precipitates was separated by filtration and washed with an additional 10 ml of water. Recrystallization from n-heptane afforded 0.6 g (71 percent) of analytically pure material that had a melting point of 87.8°.

Anal. Calcd. for $C_{15}H_{17}N_5$: C, 67.4; H, 6.41; N, 26.2. Found: C, 67.40 ; H, 6.44 ; N, 26.30

EXAMPLE XI 2-phenyl-7-piperidinopyrazolo[1,5a]1,3,5-triazine (compound O)

A solution of 7-methylthio-2-phenylpyrazolo[1,5a]-1,3,5-triazine (G) (1.5 g, 6.9 mmoles) and piperidine (0.59 g, 6.8 mmoles) in 50 ml of anhydrous methanol was heated at reflux for 8 hrs. At the end of this time, the solvent was removed at reduced pressure and the residue titurated with 10 ml of water. The residue was recrystallized from a mixture of methanol and water to afford 0.97 g (50) of analytically pure product that had a melting point of 82°–4°.

Anal. Calcd. for $C_{16}H_{17}N_5$: C, 68.8; H, 6.13; N, 25.1. Found: C, 68.75; H, 6.12; N, 25.29.

EXAMPLE XII 7-n-butylamino-2-phenylpyrazolo[1,5a]1,3,5-triazine (compound M)

A solution of 7-methylthio-2-phenylpyrazolo[1,5a]-1,3,5-triazine (G) (1.5 g, 6.9 mmoles) and n-butylamine (0.51 g, 6.9 mmoles) in 50 ml of anhydrous methanol was refluxed for 4 hrs. At the end of this time, the solvent was removed at reduced pressure and the residue titurated with 10 ml of water. The crystalline residue was recrystallized from a mixture of ethanol and water to afford 1.6 g (94 percent) of analytically pure product that had a melting point of 120°–2°.

Anal. Calcd. for $C_{15}H_{17}N_5$: C, 67.4; H, 6.41; N, 26.2. Found: C, 67.05; H, 6.78; N, 26.58.

EXAMPLE XIII

The compounds of this invention have been tested for their ability to inhibit action of the enzyme phosphodiesterase.

3',5'-cyclic AMP phosphodiesterase (PDE) has been isolated and purified from two different tissues in the following manner. Homogenates of rabbit heart and rabbit lung were made in sucrose-Tris-magnesium buffer and were subjected to centrifugation at low speed to remove nuclei and cell debris. The supernatants were then centrifuged at 105,000x g for 30 minutes. The 105,000x g supernatants were then fractionated using $(NH_4)_2SO_4$. The precipitation which formed at 0–30 percent saturation was collected by centrifugation at 20,000x g and dissolved in Tris-magnesium buffer and dialyzed overnight against the same buffer. A second $(NH_4)_2SO_4$ fraction was obtained by raising the concentration of the first supernatant to 50 percent. These two $(NH_4)_2SO_4$ fractions as well as the supernatant from the 30–50 percent cut were then assayed for PDE activity using the method of Appleman, *Biochemistry* 10, 311 (1971). The first fraction obtained from both heart and lung tissue was found to contain a PDE with low affinity for 3', 5'-cyclic AMP (high Km). The second fraction was found to exhibit a biphasic curve when the Lineweaver-Burk method of analysis was used. This indicates either the presence of two separate enzymes, one having a high and the other a low affinity for the enzymes, or one protein with two separate sites. Appleman, supra, indicates that extracts of brain yield two separate enzymes (a high Km and a low Km) which can be separated by sepharose gel chromatography.

All of the inhibitory studies reported here were performed with the high affinity (Fraction II, low Km) enzyme obtained from rabbit heart or rabbit lung. $I_{50}$ values were calculated in some instances from a plot of log I vs. percent I in experiments in which inhibitor concentration was varied over a wide range, at a constant 3', 5'-cyclic AMP concentration of approximately 1.7 $\times 10^{-7}$ M. The relative inhibitory activity of each compound is compared with theophylline is expressed as an $\alpha$ value. This value is obtained by dividing the $I_{50}$ value for theophylline in a particular experiment by the $I_{50}$ value obtained for the particular compound being evaluated. In most instances $\alpha$ values were calculated from an inhibition study performed with a single concentration of test compound as long as the inhibition produced by that concentration was from 20–80 percent. In this instance an $\alpha$ value was calculated by dividing the concentration of test substance giving x percent inhibition/concentration of theophylline giving the same (X percent) inhibition.

The validity of this method has been checked by comparing $\alpha$ values obtained by (1) measurements at a single concentration of inhibitor and (2) measurements at four concentrations of inhibitor ($I_{50}$ determinations). $\alpha$ values compared in this way have been found to agree to within 10 percent of each other.

The basic incubation mixture contained the following substances (amounts in $\mu$moles): $^3$H-cAMP (specific activity ~2,180 cmp/pmole), 0.00016; Tris pH 7.5, 40; $MgCl_2$, 0.5; Enzyme (cAMP phosphodiesterase), 5–50 $\mu$g protein; and $10^{-4}$ to $10^{-6}$ molar concentration of the inhibitor; incubation time 10 minutes at 30°C. At the end of incubation the mixtures are heated to 90°C for 2 minutes and 100 $\mu$g of snake venom phosphodiesterase from Crotalus atrox was added and the tubes incubated for 10 minutes at 30°C. The mixture was then cooled and 1 ml of a Dowex 1-2X, 200–400 mesh suspension, prepared by mixing 100 g of the resin in 200 g $H_2O$, was added and the mixture centrifuged. An aliquot of the supernatant was used to determine counts per minute using a liquid scintillation spectrometer.

Zero time values were obtained using incubations in which the cAMP phosphodiesterase was omitted from the first incubation.

TABLE I

INHIBITION OF 3',5'-CYCLIC AMP PHOSPHODIESTERAISE ISOLATED FROM RABBIT LUNG AND HEART

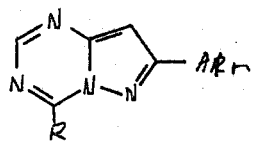

| Compound | Ar | R | αlung | αheart |
|---|---|---|---|---|
| D | phenyl | OH | 0.6 | 0.4 |
| E | phenyl | SH | 3.2 | 3.5 |
| F | phenyl | NH$_2$ | 3.0 | 2.0 |
| G | phenyl | SCH$_3$ | 11.0 | 7.3 |
| H | phenyl | NH-NH$_2$ | 0.6 | 1.0 |
| L | phenyl | NH-CH$_2$-CH$_2$-CH$_3$ | 26.0 | 3.8 |
| M | phenyl | NH-CH$_2$-CH$_2$-CH$_2$-CH$_3$ | 13.5 | 2.5 |
| N | phenyl | N(CH$_2$-CH$_3$)$_2$ | 143 | 57 |
| O | phenyl | -N⟨piperidino⟩ | 29 | 11 |

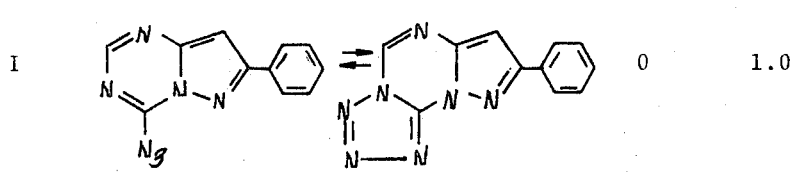

| | | |
|---|---|---|
| I | 0 | 1.0 |

| | | |
|---|---|---|
| J | 0 | 1.0 |

It will be observed from the foregoing results that several of the compounds of this invention have shown inhibition capability significantly superior to theophylline, with 2-phenyl-7-diethylamino pyrazolo[1,5a]1,3,5-triazine (compound N) demonstrating vastly superior capability, 143 times greater for rabbit lung phosphodiesterase and 57 times greater for rabbit heart phosphodiesterase. The other 7-alkylamino and piperidino substituted compounds likewise showed inhibition capability far superior to theophylline. By the same token, the results shown in Table I indicate that these compounds possess selective phosphodiesterase enzyme inhibitory capability.

The 7-hydrazino-2-phenyl-pyrazolo[1,5a]1,3,5-triazine has been tested in vivo and shown ability to inhibit death in mice from anaphylactic shock at a concentration of 100 mg/kg.

We claim:

1. A compound of the structure

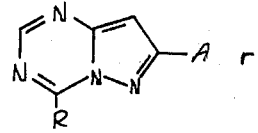

wherein R is selected from the group consisting of SH; NH$_2$; OH; NH—NH$_2$; N=N=N; SR$_1$, OR$_1$, NHR$_1$ and N(R$_1$)$_2$ where R$_1$ is C$_1$-C$_6$ alkyl; and

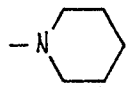

; and wherein Ar is phenyl or phenyl substituted with halogen, C$_1$ to C$_6$ alkyl or methoxy.

2. The compound of claim 1 in which Ar is phenyl.
3. The compound of claim 2 in which Ar is phenyl and R is NH$_2$.
4. The compound of claim 2 in which Ar is phenyl and R is an alkyl amine.
5. The compound of claim 2 in which Ar is phenyl and R is

6. The compound of claim 4 in which R is N(R$_1$)$_2$ and R$_1$ is C$_2$H$_5$.
7. 2-phenyl-7-diethylamino pyrazolo[1,5a]1,3,5-triazine.
8. 2-phenyl-7-piperidinopyrazolo[1,5a]1,3,5-triazine.
9. 2-phenyl-7-n-propylaminopyrazolo[1,5a]1,3,5-triazine.
10. 2-phenyl-7-n-butylaminopyrazolo[1,5a]1,3,5-triazine.
11. 2-phenyl-7-methylthiopyrazolo[1,5a]1,3,5-triazine.

* * * * *